(12) United States Patent
Bhat et al.

(10) Patent No.: US 10,556,688 B2
(45) Date of Patent: Feb. 11, 2020

(54) ONE-MOTION TABLE LATCH

(71) Applicant: Safran Seats USA LLC, Gainesville, TX (US)

(72) Inventors: Vishwanath Bhat, Rancho Cucamonga, CA (US); Christopher M. Gumbleton, Riverside, CA (US); Mark Carpenter, Glendora, CA (US)

(73) Assignee: Safran Seats USA LLC, Gainesville, TX (US)

( * ) Notice: Subject to any disclaimer, the term of this patent is extended or adjusted under 35 U.S.C. 154(b) by 111 days.

(21) Appl. No.: 15/741,969

(22) PCT Filed: Jun. 3, 2016

(86) PCT No.: PCT/US2016/035650
§ 371 (c)(1),
(2) Date: Jan. 4, 2018

(87) PCT Pub. No.: WO2017/007549
PCT Pub. Date: Jan. 12, 2017

(65) Prior Publication Data
US 2018/0194477 A1     Jul. 12, 2018

Related U.S. Application Data

(60) Provisional application No. 62/190,084, filed on Jul. 8, 2015.

(51) Int. Cl.
*B64D 11/06* (2006.01)
*E05C 1/00* (2006.01)
*E05C 1/10* (2006.01)

(52) U.S. Cl.
CPC .......... *B64D 11/0638* (2014.12); *E05C 1/004* (2013.01); *E05C 1/006* (2013.01);
(Continued)

(58) Field of Classification Search
CPC .......... Y10T 292/0969; Y10T 292/097; Y10T 292/0997; E05C 1/004; E05C 1/006; B64D 11/0638
(Continued)

(56) References Cited

U.S. PATENT DOCUMENTS 4,226,452 A * 10/1980 Hoffman .................. A47D 7/02
                                                        292/175
6,592,179 B1 * 7/2003 Miyazaki ................. B60N 2/60
                                                        297/146
(Continued)

FOREIGN PATENT DOCUMENTS

DE          10333912       2/2005
DE        102008052296     4/2010
(Continued)

OTHER PUBLICATIONS

International Patent Application No. PCT/US2016/035650, Search Report and Written Opinion, dated Aug. 9, 2016.

*Primary Examiner* — Syed A Islam
(74) *Attorney, Agent, or Firm* — Kilpatrick Townsend & Stockton LLP; Dean W. Russell; Anthony L. Guebert

(57) ABSTRACT

A latch assembly (110) can include a latch rail (314), a latch body (312), and a biasing mechanism (322). The latch rail can include a first end (318) and a second end. The first end can couple to a back portion of a seat that includes a table body. The latch body (312) can couple to the second end of the latch rail (314) such that the latch body can move between a first position and a second position relative to the latch rail. The latch body can prevent the table body from moving between a stowed position and a stowed position while in the first position. The latch body can allow the table body to move between the stowed position and the deployed position in the second position. The biasing mechanism
(Continued)

(322) can couple to the latch body (312) and can bias the latch body into the first position.

20 Claims, 9 Drawing Sheets

(52) U.S. Cl.
CPC ............ *E05C 1/10* (2013.01); *Y10T 292/097* (2015.04); *Y10T 292/0969* (2015.04); *Y10T 292/0997* (2015.04)

(58) Field of Classification Search
USPC ......... 297/163; 292/352, 307, 277, 202, 170
See application file for complete search history.

(56) References Cited

U.S. PATENT DOCUMENTS

| | | | |
|---|---|---|---|
| 7,539,521 B2* | 5/2009 | Nam | H01M 2/1022 292/163 |
| 8,702,163 B2* | 4/2014 | Westerink | B60N 3/004 297/146 |
| 2006/0028028 A1* | 2/2006 | Schultz | E05B 9/00 292/175 |
| 2011/0187163 A1 | 8/2011 | Westerink et al. | |
| 2012/0012708 A1 | 1/2012 | Hasegawa et al. | |
| 2014/0077533 A1 | 3/2014 | Shih et al. | |
| 2014/0159441 A1 | 6/2014 | Philipzik et al. | |

FOREIGN PATENT DOCUMENTS

| | | |
|---|---|---|
| DE | 102011011657 | 8/2012 |
| DE | 102013018447 | 6/2014 |
| EP | 2708413 | 3/2014 |
| EP | 2740664 | 6/2014 |
| FR | 2831496 | 5/2003 |
| FR | 3012089 | 4/2015 |
| WO | 2011094668 | 8/2011 |

* cited by examiner

ONE-MOTION TABLE LATCH

CROSS REFERENCE TO RELATED APPLICATIONS

This application is related to and claims priority benefits from U.S. Provisional Application Ser. No. 62/190,084 ("the '084 application"), filed on Jul. 8, 2015, entitled "One Motion Food Table Latch." The '084 application is hereby incorporated in its entirety by this reference.

TECHNICAL FIELD

The present disclosure relates generally to a latch and, more particularly (although not necessarily exclusively), to a one-motion table latch for passenger seats in a vehicle such as an aircraft.

BACKGROUND

Tray tables can be included in an aircraft seat assembly. A tray table can pivot to allow the tray table to move between a deployed and stowed position. In the deployed position, a tray table can provide a usable surface for a person sitting behind the seat (e.g., a passenger situated aft of a forward-facing seat). The surface may be used for supporting food, a drink, or other items, such as for work or entertainment. The pivoting nature of a tray table can be useful in allowing the tray table to be readily deployed or readily stowed, such as to facilitate egress or ingress to a seat behind the seat with the tray table.

A latch assembly can prevent a tray table from moving from a stowed position. Some latch assemblies include a rotating latch that can be rotated around an axis between a locked position and unlocked position. In a locked position, the rotating latch can secure the tray table in a stowed position, but can also obstruct the pivoting motion of the tray table assembly and prevent the tray table from moving from a deployed position to a stowed position. A rotating latch can also protrude a sufficient amount to be bumped by passengers during ingress or egress from a seat behind the seat with the tray table. This incidental contact may trigger inadvertent release and sudden movement of the tray assembly table, which may result in injury to passengers or damage to passengers' belongings or other items. Inadvertent release and corresponding harm may similarly occur due to forces or contact encountered during a crash scenario. Additionally, a rotating latch may be a projecting feature that poses an increased risk of injury for a passenger in a crash scenario.

Moving a tray table, with a rotating latch assembly, to a stowed position can take two or more actions by a user. For example, to move to the stowed position a passenger can rotate the latch assembly to an unlocked position, lift the table from the deployed position to the stowed position, and rotate the latch assembly to a locked position. An inability to move the tray table to a stowed position with a single motion can be considered an ingress and egress issue for passengers in some vehicles.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a latch assembly can include a latch rail, a latch body, and a biasing mechanism. The latch rain can include a first end and a second end. The first end can couple to a back portion of a seat that includes a table body. The latch body can couple to the second end of the latch rail such that the latch body is movable between a first position and a second position relative to the latch rail. The latch body can prevent the table body from moving between a stowed position and a deployed position in the first position. The table body can allow the table body to move between the stowed position and the deployed position in the second position. The biasing mechanism can couple to the latch body and bias the latch body into the first position.

In some embodiments, the seat is a passenger seat on an aircraft and the latch assembly can prevent emergency egress issues by allowing one-motion stowing of the table body.

In some embodiments, the table body is movable from the deployed position, with the latch body in the first position, to the stowed position, with the latch body in the first position, in response to a single motion.

In some embodiments, the latch body can include a back section and a front section. The back section can be substantially perpendicular to a longitudinal axis of the latch rail and can couple to the latch rail. The front section can be substantially perpendicular to the longitudinal axis of the latch rail and farther from the latch rail than the back section. The front section can include a beveled edge for responding to contact with the table body as the table body moves, in the single motion, from the deployed position to the stowed position by moving the latch body to the second position.

In some embodiments, the front section can include one or more recesses for providing grip to a user. At least one recesses of the one or more recesses can form an arrow for indicating a direction of a force for moving the latch body from the first position to the second position.

In some embodiments, the biasing mechanism is a spring. The section can include a channel for housing a part of the latch rail and the spring such that the latch body is slidable around the part of the latch rail and the spring.

In some embodiments, the second position is a vertical translation of the first position such that the latch body is movable along an axis substantially perpendicular to a longitudinal axis of the latch rail in response to a vertical force.

In some embodiments, the latch rail includes one or more detents. The latch rail can be positioned such that the latch rail extends at least partially through a shroud coupled to the back portion of the seat. The latch rail can be further positioned such that a detent of the one or more detents fits within a groove of the one or more grooves in the shroud for preventing the latch rail from rotating.

In some embodiments, the latch assembly can further include a fastener for coupling to the first end of the latch rail to rigidly couple the latch rail to the shroud.

In various embodiments of the present invention a seat assembly can include a seat, a table body, and a latch assembly. The seat can have a back portion with a cavity. The table body can be coupled to the back portion and be movable between a stowed position and a deployed position. In the stowed position at least a portion of the table body is stored within the cavity. The latch assembly can be move between a first position and a second position. The first position can prevent the table body from moving between the stowed position and the deployed position. The second position can allow the table body to move between the stowed position and the deployed position. The latch assembly can be responsive to a force in a single direction by moving from the first position to the second position.

In some embodiments, the seat assembly can further include a shroud coupled to the back portion. The shroud can include an opening with one or more grooves around the opening. The latch rail can include one or more detents, and can be positioned such that the latch rail extends at least partially through the opening in the shroud. The latch rain can further be positions such that a detent of the one or more detents fit within the a groove in the shroud for preventing the latch rail from rotating.

In some embodiments, the force is a vertical force and the single direction is substantially parallel to the table body in the stowed position.

In various embodiments of the present invention a method can include rotating a table body coupled to a back portion of a seat along a path from a deployed position toward a stowed position. The method can further include contacting a latch assembly with the table body, the latch assembly being coupled to the back portion of the seat such that in a first position the latch assembly obstructs the path. The method can further include moving the latch assembly to a second position based on contact by the table body with the latch assembly. The method can also include positioning the table body such that at least a portion of the table body is within a cavity in the back portion of the seat, and the latch assembly being biased to return to the first position such that the latch assembly prevents the table body from moving from the stowed position.

Various implementations described in the present disclosure can include additional system, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The disclosure provides a one-motion table latch for passenger seats. While the one-motion table latch is discussed for use with aircraft seats, they are by no means so limited. Rather, embodiments of the one-motion table latch may be used in passenger seats or other seats of any type or otherwise as desired. For example, embodiments may be used on trains, busses, in movie theaters, student seating, or any other instance when a tray table on a forward structure may be useful.

Figure 1:
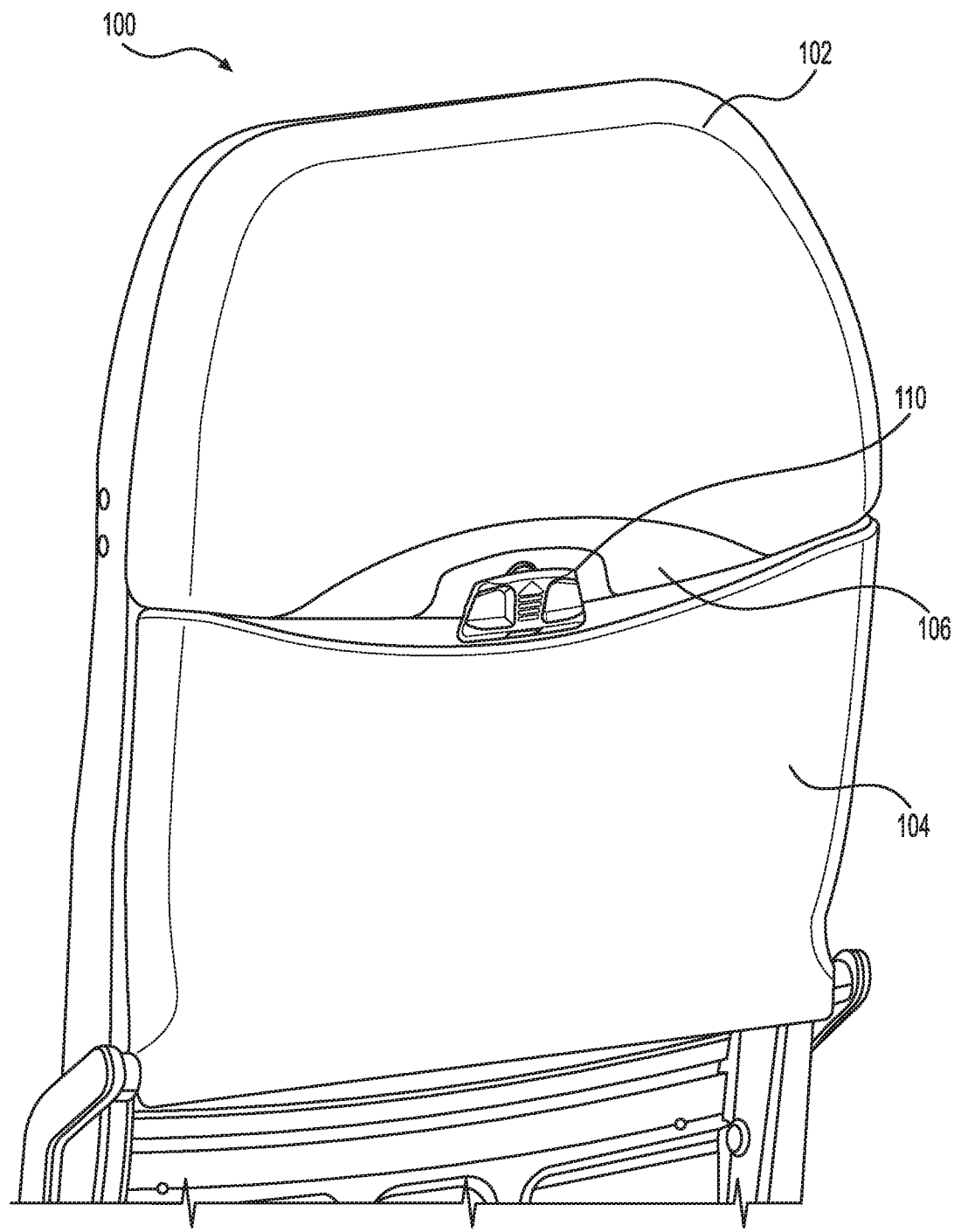
FIG. 1 is a perspective view of a seat assembly with a one-motion latch according to certain embodiments of the present invention.
Figure 2:
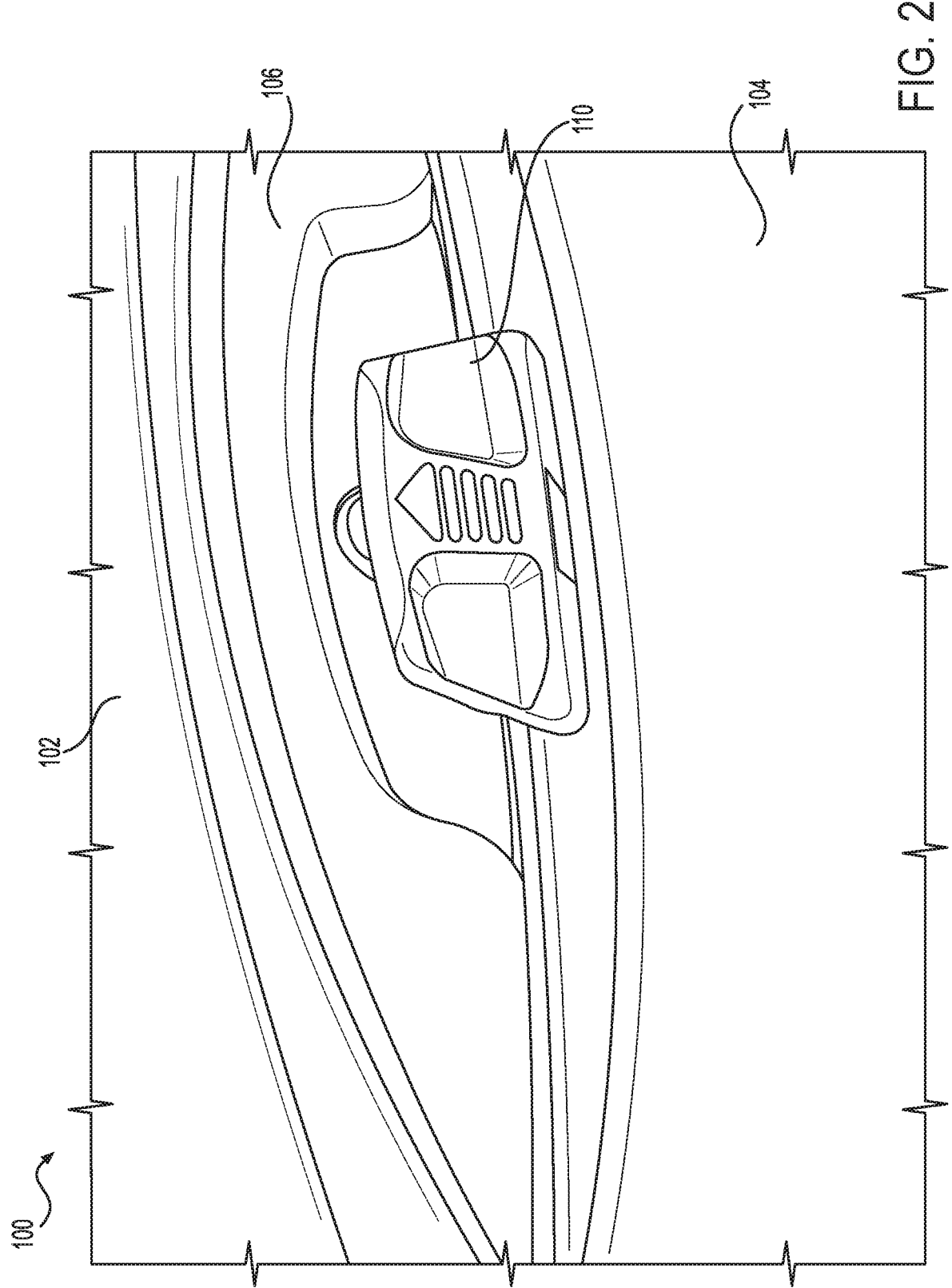
FIG. 2 is a zoomed-in perspective view of the seat assembly in FIG. 1 showing the one-motion latch according to certain embodiments of the present invention.
Figure 3A:
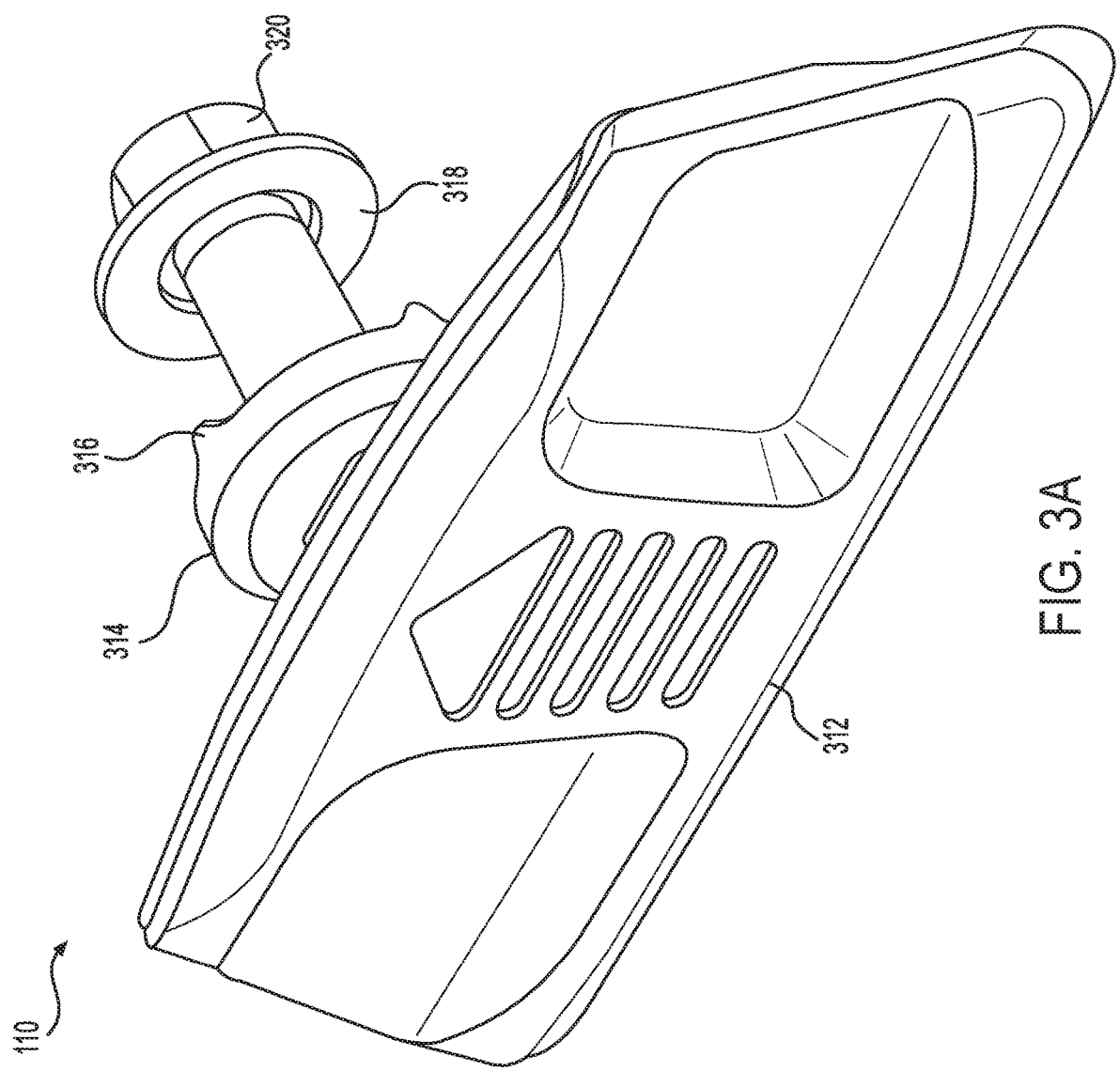
FIG. 3A is a front perspective view of the one-motion latch in FIG. 1 according to certain embodiments of the present invention.
Figure 3B:
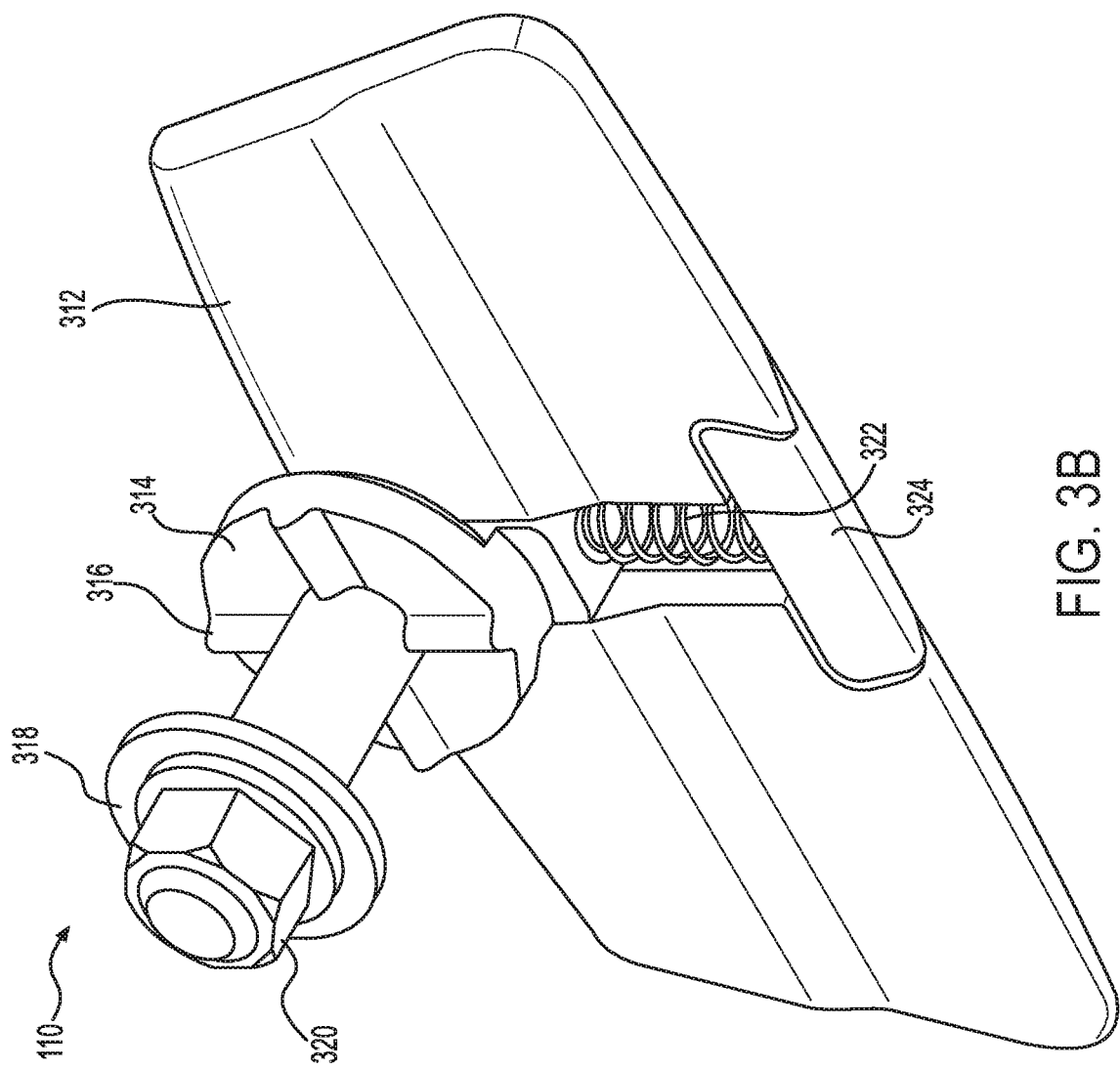
FIG. 3B is a back perspective view of the one-motion latch in FIG. 1 according to certain embodiments of the present invention.
Figure 3C:
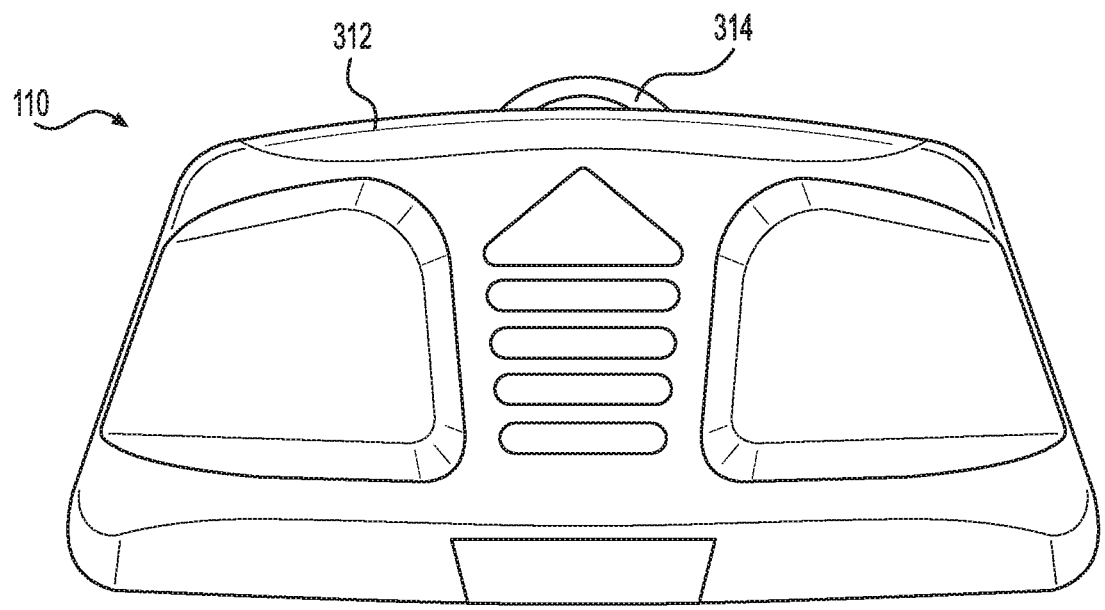
FIG. 3C is a front view of the one-motion latch in FIG. 1 according to certain embodiments of the present invention.
Figure 3D:
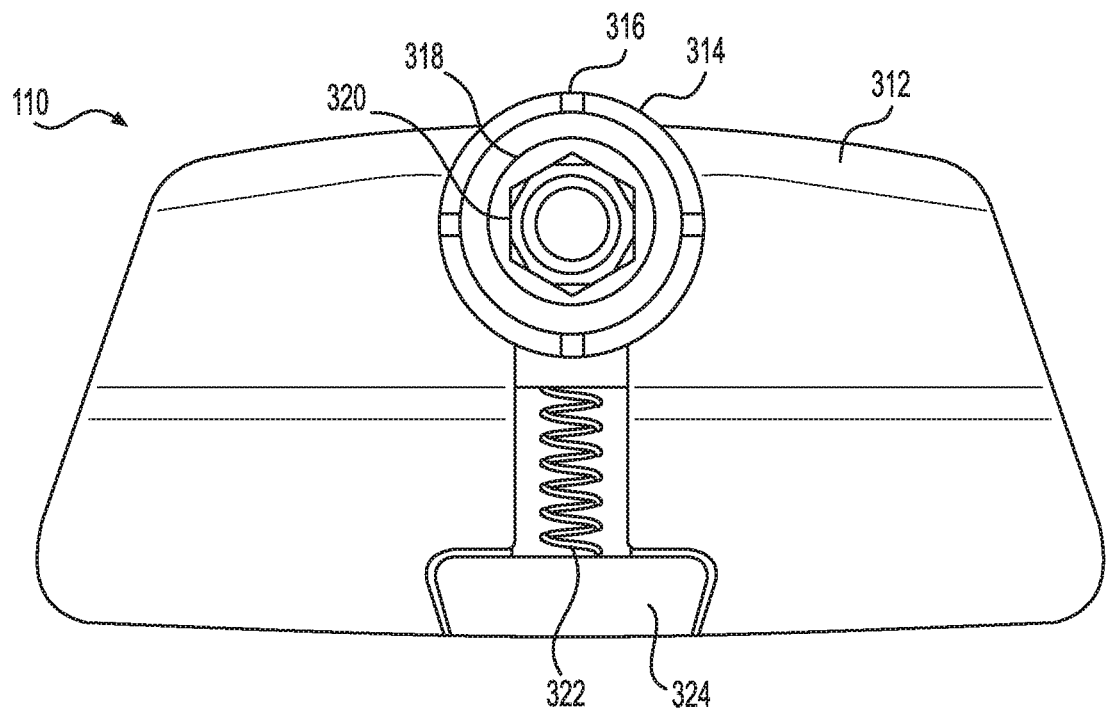
FIG. 3D is a back view of the one-motion latch in FIG. 1 according to certain embodiments of the present invention.
Figure 3E:
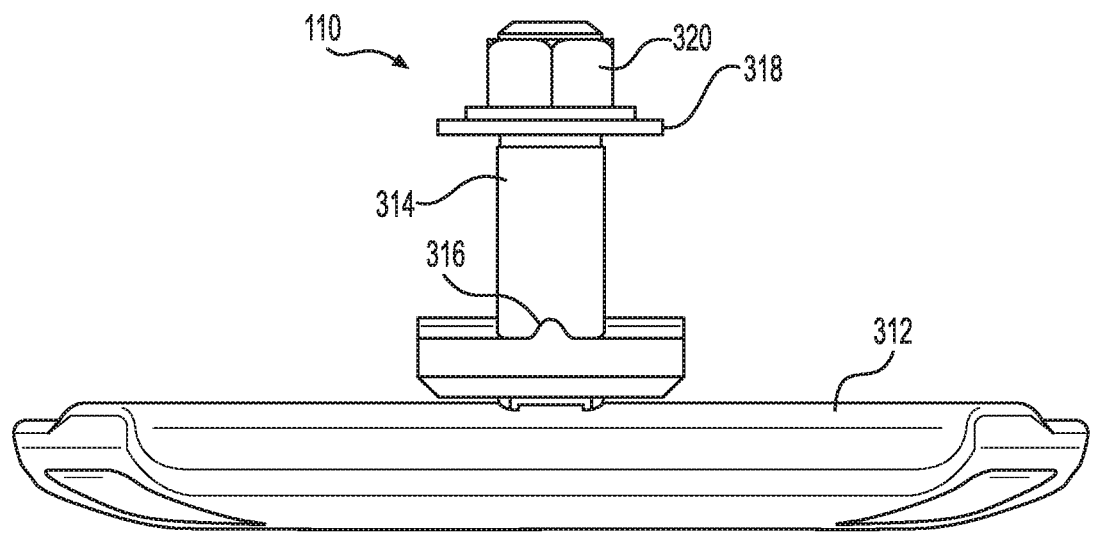
FIG. 3E is a top view of the one-motion latch in FIG. 1 according to certain embodiments of the present invention.
Figure 3F:
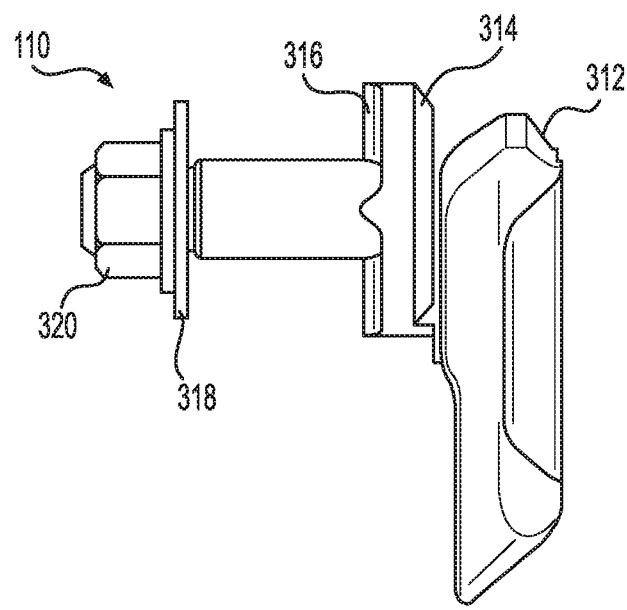
FIG. 3F is a side view of the one-motion latch in FIG. 1 according to certain embodiments of the present invention.
Figure 4:
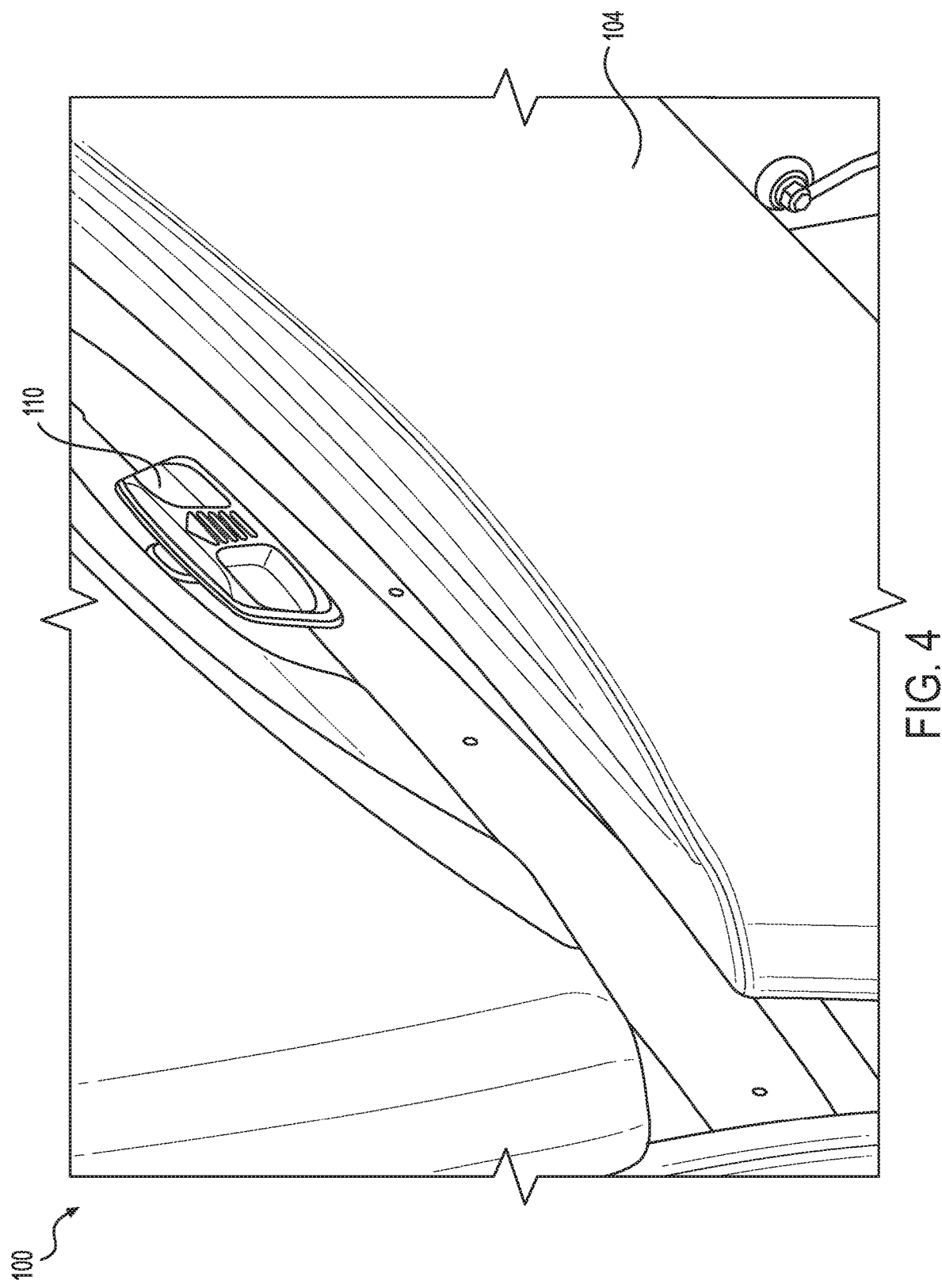
FIG. 4 is a perspective view of the seat assembly in FIG. 1 with the tray table deployed and the one-motion latch in a locked position according to certain embodiments of the present invention.
Figure 5:
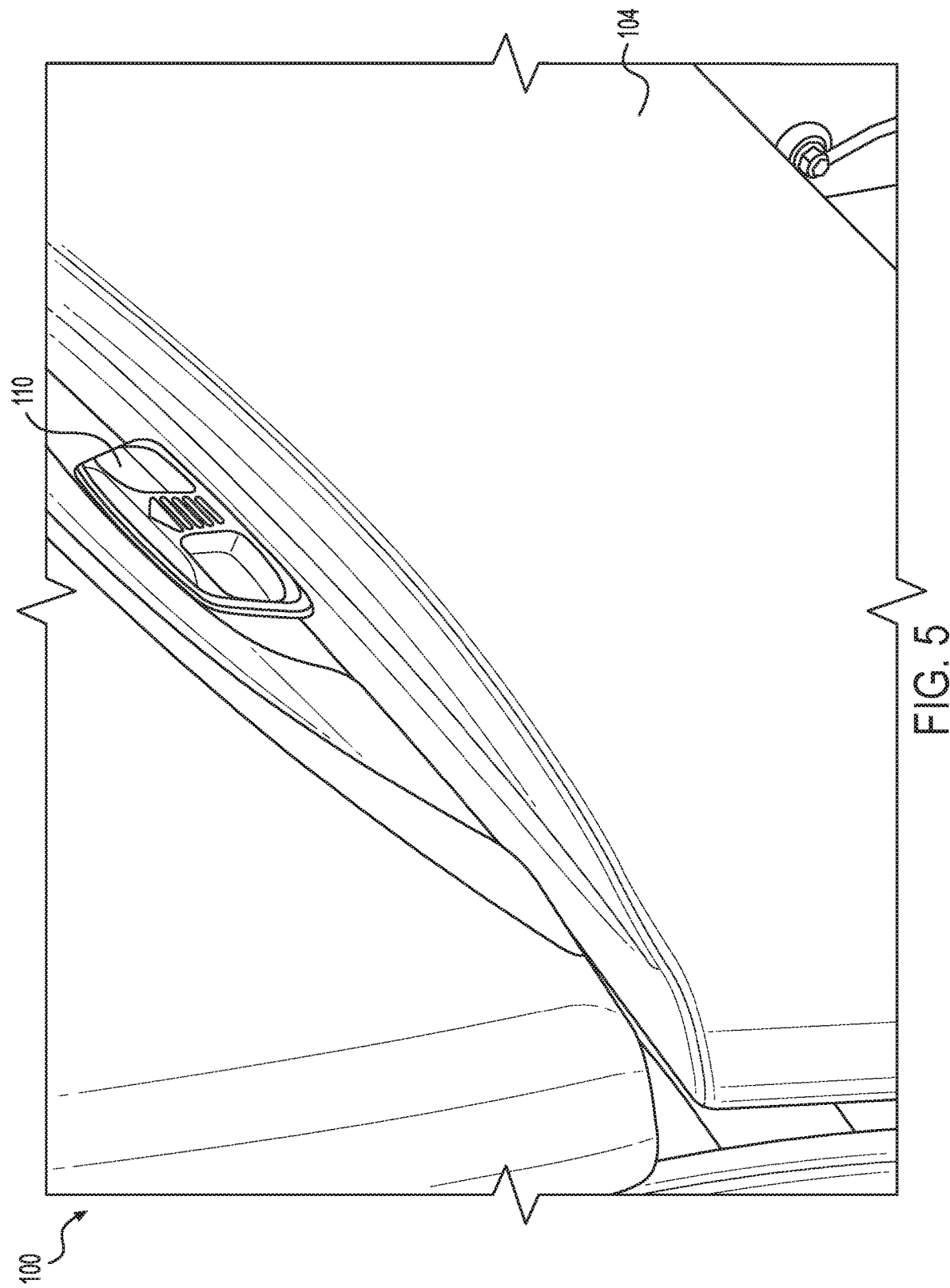
FIG. 5 is a perspective view of the seat assembly in FIG. 1 with the one-motion latch in an unlocked position according to certain embodiments of the present invention.
Figure 6:
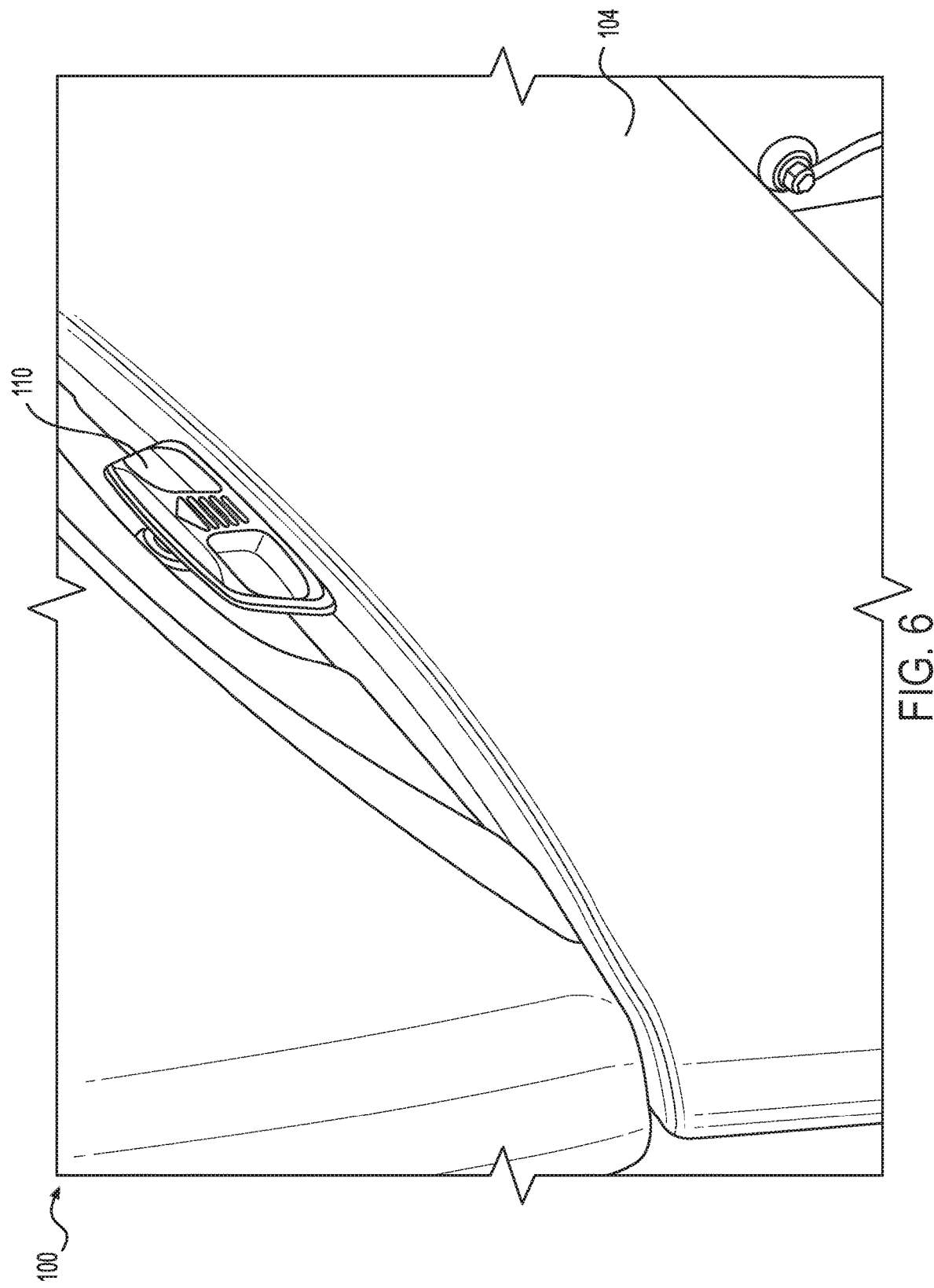
FIG. 6 is a perspective view of the seat assembly in FIG. 1 with the tray table stowed and the one-motion latch in a locked position according to certain embodiments of the present invention.

According to certain embodiments, as shown in FIGS. 1-6, a seat assembly 100 may be provided with a one-motion latch 110. Generally, FIGS. 1-2 are perspective views of the seat assembly 100 showing a tray table 104 in a stowed position, FIGS. 3A-F are various views of the one-motion latch 110, and FIGS. 4-6 are perspective views of the seat assembly 100 depicting a transition between a deployed position and the stowed position. The illustrated seat assembly 100 includes a back portion 102, a tray table 104, a shroud 106, and a one-motion latch 110. The one-motion latch 110 is further illustrated as including a latch body 312, a latch rail 314 with detents 316, a washer 318, a nut 320, a spring 322, and a wedge 324.

FIG. 1 is a perspective view of the seat assembly 100 with the one-motion latch 110. The seat assembly 100 can be a passenger seat assembly 100 for use in any vehicle including an aircraft. The seat assembly 100 includes the back portion 102 that includes the shroud 106 and the tray table 104. The tray table 104 is coupled to the back portion 102 at two pivot points but is prevented from pivoting by the one-motion latch 110. The one-motion latch 110 is coupled to the shroud 106 and can be slid to the unlocked position that allows the tray table 104 to move from the stowed position (as illustrated) to the deployed position.

In some embodiments, multiple seat assemblies can be positioned laterally adjacent one another, such as in rows in an aircraft. Multiple seat assemblies can also be arranged fore or aft of one another, e.g., such that a passenger supported by the front of one seat assembly 100 may face the back portion 102 of another seat assembly 100. In some embodiments, the back portion 102 and shroud 106 can include features accessible to a user facing the back portion 102. For example, the shroud 106 can include a screen, telephone, or other form of interface for communication, entertainment, etc.

In some embodiments, the seat assembly 100 can include a cavity defined in part by the back portion 102 and the shroud 106. In the stowed position, at least a portion of the tray table 104 can be positioned in the cavity. In additional or alternative embodiments, the tray table 104 can be deployed to provide a surface for the user.

Although the tray table 104 is depicted as rectangular, the tray table 104 may be any shape. For example, the tray table 104 may be triangular, oval, hexagonal, pentagonal, or any other regular or irregular polygonal shape. In additional or alternative examples, the tray table 104 is coupled to one or more than two pivot points. For example, a triangular tray table 104 may have a single pivot point at a corner. In additional or alternative examples, the tray table 104 may be coupled to the back portion 102 in any way that allows the tray table 104 to rotate between the stowed position and the deployed position.

In some embodiments, the components of the seat assembly 100 can include non-rigid or pliable materials (e.g., fabric, textiles, foam, or other cushioning material). Other more rigid materials may also be included, such as to reinforce pliable materials, or to provide components for other functions. For example, the shroud 106 may be formed from rigid material that is coupled with cushioning material of the back portion 102. Suitable examples of rigid material that may be used for the shroud 106 and other components described herein include, but are not limited to aluminum, stainless steel, aramid fibers, other metallic materials, composite materials, plastics (e.g., polycarbonate and polypropylene), or other similar materials.

FIG. 2 is a closer perspective view of the seat assembly 100 in FIG. 1 showing the one-motion latch 110. The one-motion latch 110 can be in a locked position such that it extends into a path that can be traveled by the tray table 104 when moving between the stowed position and the deployed position. The tray table 104 can include a lip such that, in the locked position, the one-motion latch 110 extends over the lip, and a portion of the tray table 104 remains farther from the cavity than the one-motion latch 110. The one-motion latch 110 can be responsive to a force in a single direction by moving to the unlocked position. While the one-motion latch 110 is in the unlocked position, the one-motion latch 110 can be above the path, and the tray table 104 can move to the deployed position. The one-motion latch 110 can include a biasing mechanism such that once the force is removed, the one-motion latch 110 returns to the locked position. The one-motion latch 110 is further depicted in FIGS. 3A-F and described below.

FIG. 3A is a front perspective view of the one-motion latch 110 in FIG. 1, including the latch body 312 and the latch rail 314. The latch body 312 can include a surface that in the locked position can extend into the path traveled by the tray table 104 to move between the stowed position and the deployed position. The latch body 312 can be coupled to the latch rail 314, such that a force substantially perpendicular to the longitudinal axis of the latch rail 314 can move the latch body 312 relative to the latch rail 314. In some examples, the latch body 312 can move far enough away from the path that the one-motion latch 110 can be in the unlocked position.

The latch body 312 is depicted as having two recesses for a user to position one or more digits, which can include a thumb. The two recesses can provide grip to the user applying a force to slide the latch body 312 to the unlocked position. The latch body 312 is further depicted as having several recesses that form the shape of an arrow for providing grip and indicating the direction of the force that can move the latch body 312 to the unlocked position.

The latch rail 314 includes a first end couplable to the seat assembly 100 and a second end coupled to the latch body 312. In some embodiments, at least part of the latch rail 314 can be positioned through an opening in the shroud 106 coupled to seat assembly 100. The washer 318 and nut 320 can couple the latch rail 314 to the shroud 106 by attaching to the part of the latch rail 314 positioned through the opening. In additional or alternative embodiments, any suitable fasteners, which include but are not limited to screws, bolts, rivets or other mechanical or chemical fasteners can be used for coupling the latch rail 314 to the shroud 106. In some embodiments, the latch rail 314 can include detents 316 that can be positioned within grooves in the shroud 106 to rigidly couple the latch rail 314 to the seat assembly 100 by preventing the latch rail 314 from rotating around its longitudinal axis.

In some embodiments, the one-motion latch 110 can be implemented on existing passenger seats. For example, an existing latch can be coupled to the shroud 106 coupled to the seat assembly 100. The existing latch can be removed leaving an opening in the shroud 106, and the latch rail 314 of the one-motion latch 110 can be positioned to at least partially pass through the opening. Any suitable fasteners, which include but are not limited to screws, bolts, rivets, nuts, washers or other mechanical or chemical fasteners can couple the latch rail 314 of the one-motion latch 110 to the shroud 106. In additional or alternative examples, the latch rail 314 of the one-motion latch 110 can include detents 316 that can be positioned within grooves in the shroud 106 to rigidly couple the latch rail 314 to the shroud 106 and prevent the one-motion latch 110 and the latch rail 314 from rotating. In additional or alternative embodiments, the one-motion latch 110 can be manufactured as a component of the seat assembly 100

FIG. 3B is a back perspective view of the one-motion latch 110 in FIG. 1 and further shows a spring 322 and a wedge 324. As illustrated, the back section of latch body 312 can include a channel for housing a portion of the second end of latch rail 314 and the spring 322. The spring 322 can extend between the latch rail 314 and the wedge 324. Since the latch rail 314 can be rigidly coupled to the shroud 106, the spring 322 can apply a biasing force to the wedge 324 that biases the latch body 312 to the locked position. A vertical force, which can include a force substantially perpendicular to the longitudinal axis of the latch rail 314 and away from the tray table 104, can be applied to the latch body 312, and can cause the spring 322 to be compressed. In some examples, compression of the spring 322 can cause the wedge 324 to move closer to the latch rail 314. The latch body 312 can further slide around the latch rail 314 such that the latch body 312 moves to the unlocked position, which is a vertical translation of the latch body 312 in the locked position.

In some embodiments, the wedge 324 can be manufactured separately from the latch body 312 such that an opening in the latch body 312 can allow the latch rail 314 to be slid into the channel and then the wedge 324 can be attached using any suitable fastener. In additional or alternative embodiments, the wedge 324 can be manufactured as a contiguous part of the latch body 312. For example, the wedge 324 and latch body 312 may be manufactured from a single mold. Although FIG. 3B depicts the spring 322, any biasing mechanism can be used to bias the one-motion latch 110 into the locked position.

FIGS. 3C-3F depict additional views of the one-motion latch 110 and illustrate an example of the structure of the one-motion latch 110. Other structures for the one-motion latch 110 are possible. For example, although the latch rail 314 is depicted as extending higher than the latch body 312 in the locked position, various shapes and sizes of the latch body 312 are possible. Some examples include a circular latch body. In additional or alternative embodiments, the latch rail 314 may be longer, such that the one-motion latch 110 extends farther from the back portion 102 of the seat assembly 100.

As depicted in FIG. 3F, a side view of the one-motion latch 110 in FIG. 1, the latch body 312 can include a beveled edge. The beveled edge can be the section of the latch body 312 that, in the locked position, extends into the path traveled by the tray table 104 as the tray table 104 moves between the stowed position and deployed position. The beveled edge can have an angle such that the tray table 104 moving from the deployed position to the stowed position can contact the beveled edge and apply the force that causes the latch body 312 to move to the unlocked position. In some examples, a portion of the force being applied to move the tray table 104 to the stowed position can be converted into a force that is substantially parallel to the tray table 104. The portion of the force that is substantially parallel to the tray table 104 may be enough to overcome the biasing mechanism and move the one-motion latch 110 to the unlocked position. As a result, the tray table 104 can be stowed using a single motion, lifting the tray table 104 from the deployed position toward the stowed position.

Although the beveled edge is depicted at an angle that appears a little less than 45°, any angle can be used that can convert the force being applied to the tray table 104 to a vertical force for moving the one-motion latch 110 to the unlocked position. For example, the beveled edge with an angle between 30°-60° can allow the tray table 104 to be stowed using a single motion.

In various embodiments, the one-motion latch 110 can include elements that prevent the tray table 104 coupled to the seat assembly 100 from unintentionally deploying and can allow the user to move the tray table 104 between the deployed position and the stowed position using a single motion. In some examples, the one-motion latch 110 in the locked position can prevent the tray table 104 from deploying by extending into the path traveled by the tray table 104 as the tray table 104 rotates between the stowed position and deployed position. To deploy the tray table 104, the user can slide the one-motion latch 110 to an unlocked position, using the force in a single vertical direction, allowing the tray table 104 to rotate along the path from its stowed position to the deployed position. To stow the tray table 104, the user can rotate the tray table 104 upward toward the seat back. When rotating the tray table 104 from the deployed position to the stowed position, the one-motion latch 110 can respond to contact with the tray table 104 by moving to the unlocked position. Once the tray table 104 is in the stowed position, the one-motion latch 110 can be biased to return to the locked position to secure the tray table 104.

In some embodiments, the one-motion latch 110 can improve the safety for passengers sitting behind the seat assembly 100 with the tray table 104. For example, the one-motion latch 110 can allow passengers to quickly and easily stow and secure the tray table 104 with a single motion, reducing the obstructions to egress in an emergency. In additional or alternative examples, the one-motion latch 110 can be less likely to deploy in a crash scenario. During impact, the passenger's head can impact the back portion 102 of the seat assembly 100 in front of them and slide against the tray table 104 and may cause a rotating force on a latch. Since the one-motion latch 110 can be responsive to a vertical force, the one-motion latch 110 can be unlikely to move to the unlocked position due to contact with the passenger during impact. Furthermore, the one-motion latch 110 can be less likely to deploy due to a passenger brushing against the one-motion latch 110 during egress.

FIGS. 4-6 are perspective views of the seat assembly 100 in FIG. 1 with the tray table 104 moving from the deployed position to the stowed position. FIG. 4 is a perspective view of the seat assembly 100 with the tray table 104 deployed and the one-motion latch 110 in the locked position. As illustrated, the one-motion latch 110 is extending into the path the tray table 104 can take to move to the stowed position.

FIG. 5 is a perspective view of the seat assembly 100 with the one-motion latch 110 in the unlocked position. In some embodiments, the one-motion latch 110 may have moved to the unlocked position in response to contact with the tray table 104. For example, an edge of the tray table 104 may have contacted the beveled edge of the one-motion latch 110 and applied the force that caused the one-motion latch 110 to move to the unlocked position. A portion of the force may have been transferred from a single motion applied by the user to stow the tray table 104 to a vertical force that overcame the biasing force keeping the one-motion latch 110 in the locked position. In additional or alternative examples, the vertical force may have been the force that was substantially perpendicular to the longitudinal axis of the latch rail 314 coupling the one-motion latch 110 to the shroud 106 of the seat assembly 100.

FIG. 6 is a perspective view of the seat assembly 100 with the tray table 104 stowed and the one-motion latch 110 in the locked position. In some embodiments, the user may have positioned the tray table 104 in the stowed position eliminating the contact between the beveled edge of the one-motion latch 110 and the tray table 104. The biasing mechanism may have moved the one-motion latch 110 back to the locked position. In the locked position, the one-motion latch 110 can prevent unintended deployment of the tray table 104. As illustrated in FIGS. 4-6 the user can stow the tray table 104 that is part of seating assembly 100 using a single motion.

In the following, further examples are described to facilitate the understanding of the invention:

Example 1

A latch assembly comprising: a latch rail with a first end and a second end, the first end for coupling to a back portion of a seat that includes a table body; a latch body for coupling to the second end of the latch rail such that the latch body is movable between a first position and a second position relative to the latch rail, the latch body for preventing the table body from moving between a stowed position and a deployed position in the first position, the latch body for allowing the table body to move between the stowed position and the deployed position in the second position; and a biasing mechanism coupled to the latch body for biasing the latch body into the first position.

Example 2

The latch assembly of any of the preceding or subsequent examples, wherein the seat is a passenger seat on an aircraft and the latch assembly prevents emergency egress issues by allowing one-motion stowing of the table body.

Example 3

The latch assembly of any of the preceding or subsequent examples, wherein the table body is movable from the deployed position, with the latch body in the first position, to the stowed position, with the latch body in the first position, in response to a single motion.

Example 4

The latch assembly of any of the preceding or subsequent examples, wherein the latch body comprises: a back section substantially perpendicular to a longitudinal axis of the latch rail and coupled to the latch rail; a front section substantially perpendicular to the longitudinal axis of the latch rail and farther from the latch rail than the back section; wherein the front section comprises a beveled edge for responding to contact with the table body as the table body moves, in the single motion, from the deployed position to the stowed position by moving the latch body to the second position.

Example 5

The latch assembly of any of the preceding or subsequent examples, wherein the front section comprises one or more recesses for providing grip to a user, wherein at least one recesses of the one or more recesses forms an arrow for indicating a direction of a force for moving the latch body from the first position to the second position.

Example 6

The latch assembly of any of the preceding or subsequent examples, wherein the biasing mechanism is a spring, and wherein the back section comprises a channel for housing a part of the latch rail and the spring such that the latch body is slidable around the part of the latch rail and the spring.

Example 7

The latch assembly of any of the preceding or subsequent examples, wherein the second position is a vertical translation of the first position such that the latch body is movable along an axis substantially perpendicular to a longitudinal axis of the latch rail in responsive to a vertical force.

Example 8

The latch assembly of any of the preceding or subsequent examples, wherein the latch rail includes one or more detents, and wherein the latch rail is positionable such that the latch rail extends at least partially through a shroud coupled to the back portion of the seat, and wherein the latch rail is further positionable such that a detent of the one or more detents fits within a groove of the one or more grooves in the shroud for preventing the latch rail from rotating.

Example 9

The latch assembly of any of the preceding or subsequent examples, further comprising a fastener for coupling to the first end of the latch rail to rigidly couple the latch rail to the shroud.

Example 10

A seat assembly comprising: a seat having a back portion with a cavity; a table body coupled to the back portion and movable between a stowed position and a deployed position, such that in the stowed position at least a portion of the table body is stored within the cavity; and a latch assembly movable between a first position and a second position, the first position for preventing the table body from moving between the stowed position and the deployed position and the second position for allowing the table body to move between the stowed position and the deployed position, and the latch assembly being responsive to a force in a single direction by moving from the first position to the second position.

Example 11

The seat assembly of any of the preceding or subsequent examples, wherein the seat is a passenger seat on an aircraft and the latch assembly prevents emergency egress issues by allowing one-motion stowing of the table body.

Example 12

The seat assembly of any of the preceding or subsequent examples, wherein the latch assembly comprises: a latch rail with a first end and a second end, the first end for coupling to the back portion of the seat; a latch body for coupling to the second end of the latch rail such that in the first position the latch body extends into a path used by the table body for moving between the stowed position and the deployed position; and a biasing mechanism coupled to the latch body for biasing the latch assembly to the first position.

Example 13

The seat assembly of any of the preceding or subsequent examples, wherein the latch body comprises: a back section substantially perpendicular to a longitudinal axis of the latch rail and coupled to the latch rail; a front section substantially perpendicular to the longitudinal axis of the latch rail and farther from the latch rail than the back section; wherein the front section comprises a beveled edge for responding to contact with the table body as the table body moves from the deployed position to the stowed position by moving the latch assembly to the second position.

Example 14

The seat assembly of any of the preceding or subsequent examples, wherein the front section comprises one or more recesses for providing grip to a user, wherein at least one recess of the one or more recesses form an arrow for indicating a direction of the force for moving the latch body from the first position to the second position.

Example 15

The seat assembly of any of the preceding or subsequent examples, wherein the biasing mechanism is a spring, and wherein the back section comprises a channel for housing a part of the latch rail and the spring such that the latch body is slidable around the part of the latch rail and the spring.

Example 16

The seat assembly of any of the preceding or subsequent examples, wherein the latch body in the second position is a vertical translation of the latch body in the first position, and the latch body is movable along an axis substantially perpendicular to a longitudinal axis of the latch rail.

Example 17

The seat assembly of any of the preceding or subsequent examples, further comprising a shroud couplable to the back portion, the shroud comprising an opening with one or more grooves around the opening; and wherein the latch rail comprises one or more detents, is positionable such that the latch rail extends at least partially through the opening in the shroud, and is positionable such that a detent of the one or more detents fit within the a groove in the shroud for preventing the latch rail from rotating.

Example 18

The seat assembly of any of the preceding or subsequent examples, wherein the force is a vertical force and the single direction is substantially parallel to the table body in the stowed position.

Example 19

A method comprising: rotating a table body coupled to a back portion of a seat along a path from a deployed position toward a stowed position; contacting a latch assembly with the table body, the latch assembly being coupled to the back portion of the seat such that in a first position the latch assembly obstructs the path; moving the latch assembly to a second position based on contact by the table body with the latch assembly; and positioning the table body such that at least a portion of the table body is within a cavity in the back portion of the seat, and the latch assembly being biased to return to the first position such that the latch assembly prevents the table body from moving from the stowed position.

Example 20

The method of any of the preceding or subsequent examples, wherein the seat is a passenger seat on an aircraft and the method prevents emergency egress issues by allowing one-motion stowing of the table body.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A latch assembly comprising:
    a latch rail with a first end and a second end, the first end configured to couple to a back portion of a seat that includes a table body;
    a latch body coupled to the second end of the latch rail such that the latch body is slidable along the second end of the latch rail between a first position and a second position relative to the latch rail, wherein, in the first position, the latch body is configured to prevent the table body from moving between a stowed position and a deployed position, and wherein, in the second position, the latch body is configured to allow the table body to move between the stowed position and the deployed position; and
    a biasing mechanism coupled to the latch body and biasing the latch body into the first position.

2. The latch assembly of claim 1, wherein the seat is a passenger seat on an aircraft and the latch assembly allows one-motion stowing of the table body.

3. The latch assembly of claim 1, wherein, with the latch body in the first position, the table body is movable from the deployed position to the stowed position in response to a single motion.

4. The latch assembly of claim 3, wherein the latch body comprises:
    a back section substantially perpendicular to a longitudinal axis of the latch rail and coupled to the latch rail;
    a front section substantially perpendicular to the longitudinal axis of the latch rail and farther from the latch rail than the back section;
    wherein the front section comprises a beveled edge for responding to contact with the table body as the table body moves, in the single motion, from the deployed position to the stowed position by moving the latch body to the second position.

5. The latch assembly of claim 4, wherein the front section comprises at least one gripping recess, wherein the at least one gripping recess forms an arrow for indicating a direction of a force for moving the latch body from the first position to the second position.

6. The latch assembly of claim 4, wherein the biasing mechanism is a spring, and wherein the back section comprises a channel housing a part of the latch rail and the spring such that the latch body is slidable around the part of the latch rail and the spring.

7. The latch assembly of claim 1, wherein the second position is a vertical translation of the first position such that the latch body is movable along an axis substantially perpendicular to a longitudinal axis of the latch rail in responsive to a vertical force.

8. The latch assembly of claim 1, wherein the latch rail includes one or more detents, and wherein the latch rail is positionable such that the latch rail extends at least partially through a shroud coupled to the back portion of the seat, and wherein the latch rail is further positionable such that a detent of the one or more detents fits within a groove of the one or more grooves in the shroud for preventing the latch rail from rotating.

9. The latch assembly of claim 8, further comprising a fastener rigidly coupling the first end of the latch rail to the shroud.

10. A seat assembly comprising:
a seat having a back portion with a cavity;
a table body coupled to the back portion and movable between a stowed position and a deployed position, wherein, in the stowed position, at least a portion of the table body is stored within the cavity; and
a latch assembly movable between a first position and a second position, wherein, in the first position, the latch assembly is configured to prevent the table body from moving between the stowed position and the deployed position, wherein, in the second position, the latch assembly is configured to allow the table body to move between the stowed position and the deployed position, and wherein the latch assembly is responsive to a force in a single direction by moving from the first position to the second position,
wherein the latch assembly comprises:
a latch rail with a first end and a second end, the first end for coupling to the back portion of the seat; and
a latch body coupled to the second of the latch rail, wherein the latch body is slidable along the second end of the latch rail.

11. The seat assembly of claim 10, wherein the seat is a passenger seat on an aircraft and the latch assembly allows one-motion stowing of the table body.

12. The seat assembly of claim 10, wherein
in the first position, the latch body extends into a path used by the table body for moving between the stowed position and the deployed position, and wherein the latch assembly further comprises:
a biasing mechanism coupled to the latch body and biasing the latch assembly to the first position.

13. The seat assembly of claim 12, wherein the latch body comprises:
a back section substantially perpendicular to a longitudinal axis of the latch rail and coupled to the latch rail;
a front section substantially perpendicular to the longitudinal axis of the latch rail and farther from the latch rail than the back section;
wherein the front section comprises a beveled edge for responding to contact with the table body as the table body moves from the deployed position to the stowed position by moving the latch assembly to the second position.

14. The seat assembly of claim 13, wherein the front section at least one gripping recess, wherein the at least one gripping recess forms an arrow for indicating a direction of the force for moving the latch body from the first position to the second position.

15. The seat assembly of claim 13, wherein the biasing mechanism is a spring, and wherein the back section comprises a channel housing a part of the latch rail and the spring such that the latch body is slidable around the part of the latch rail and the spring.

16. The seat assembly of claim 12, wherein the latch body in the second position is a vertical translation of the latch body in the first position, and the latch body is movable along an axis substantially perpendicular to a longitudinal axis of the latch rail.

17. The seat assembly of claim 12 further comprising:
a shroud couplable to the back portion, the shroud comprising an opening with one or more grooves around the opening; and
wherein the latch rail comprises one or more detents, is positionable such that the latch rail extends at least partially through the opening in the shroud, and is positionable such that a detent of the one or more detents fit within the a groove in the shroud for preventing the latch rail from rotating.

18. The seat assembly of claim 10, wherein the force is a vertical force and the single direction is substantially parallel to the table body in the stowed position.

19. A method comprising:
rotating a table body coupled to a back portion of a seat along a path from a deployed position toward a stowed position;
contacting a latch assembly with the table body, the latch assembly coupled to the back portion of the seat such that in a first position the latch assembly obstructs the path;
moving the latch assembly to a second position based on contact by the table body with the latch assembly; and
positioning the table body such that at least a portion of the table body is within a cavity in the back portion of the seat, and the latch assembly being biased to return to the first position such that the latch assembly prevents the table body from moving from the stowed position,
wherein moving the latch assembly comprises moving a latch body of the latch assembly along an end of a latch rail of the latch assembly.

20. The method of claim 19, wherein the seat is a passenger seat on an aircraft and the method prevents emergency egress issues by allowing one-motion stowing of the table body.

* * * * *